US010598421B2

(12) United States Patent
Kim

(10) Patent No.: US 10,598,421 B2
(45) Date of Patent: Mar. 24, 2020

(54) ICEMAKER ASSEMBLY HAVING A PLUNGER

(71) Applicant: LG ELECTRONICS INC., Seoul (KR)

(72) Inventor: Sung Kyoung Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 176 days.

(21) Appl. No.: 15/468,506

(22) Filed: Mar. 24, 2017

(65) Prior Publication Data

US 2017/0314832 A1 Nov. 2, 2017

(30) Foreign Application Priority Data

May 2, 2016 (KR) ........................ 10-2016-0053908

(51) Int. Cl.

| | |
|---|---|
| ***F25C 5/00*** | (2018.01) |
| ***B65G 47/84*** | (2006.01) |
| ***H01F 7/06*** | (2006.01) |
| ***F25C 5/04*** | (2006.01) |
| ***F25C 5/20*** | (2018.01) |
| *H01F 7/08* | (2006.01) |

(52) U.S. Cl.

CPC ................ *F25C 5/22* (2018.01); *F25C 5/046* (2013.01); *H01F 7/08* (2013.01)

(58) Field of Classification Search

CPC .. F25C 5/22; F25C 5/005; F25C 5/007; F25C 5/182; F25C 5/046; B65G 47/68; H01F 7/08

See application file for complete search history.

(56) References Cited

U.S. PATENT DOCUMENTS

| | | | | |
|---|---|---|---|---|
| 2,717,497 | A * | 9/1955 | Knerr | F25C 1/04 249/79 |
| 3,021,035 | A * | 2/1962 | Hill | F25C 5/002 222/108 |
| 3,887,119 | A * | 6/1975 | Sucro | F25C 5/00 222/247 |
| 7,963,120 | B2 * | 6/2011 | An | F25C 5/046 62/344 |
| 8,955,350 | B2 * | 2/2015 | Nuss | F25C 5/005 62/320 |
| 2006/0059939 | A1 * | 3/2006 | An | F25C 5/046 62/344 |
| 2013/0305763 | A1 * | 11/2013 | Nuss | F25C 5/046 62/320 |

FOREIGN PATENT DOCUMENTS

| | | |
|---|---|---|
| JP | 2002-195710 | 7/2002 |
| KR | 10-2011-0080020 | 7/2011 |

OTHER PUBLICATIONS

Korean Office Action dated May 19, 2017 issued in Application No. 10-2016-0053908.

* cited by examiner

*Primary Examiner* — Melvin Jones

(74) *Attorney, Agent, or Firm* — KED & Associates, LLP

(57) ABSTRACT

A stopper of an ice bucket may be for promptly stopping withdrawal of ice when a command for withdrawal of ice from the ice bucket is stopped. The stopper may be configured such that a plunger enters a rotation trajectory of a blade, at a time when the plunger needs to be moved so as to promptly stop the blade by the plunger.

20 Claims, 9 Drawing Sheets

【Fig. 1】
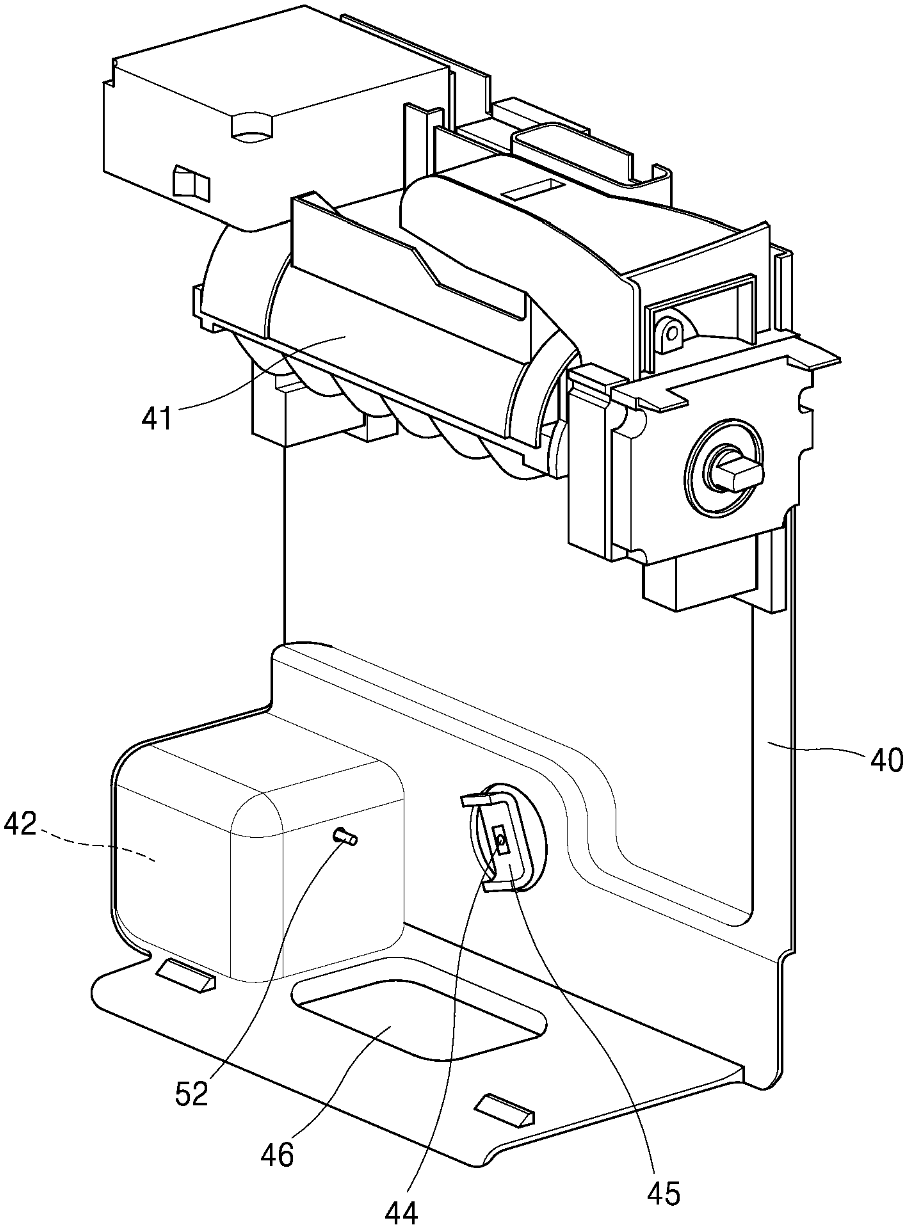

【Fig. 2】
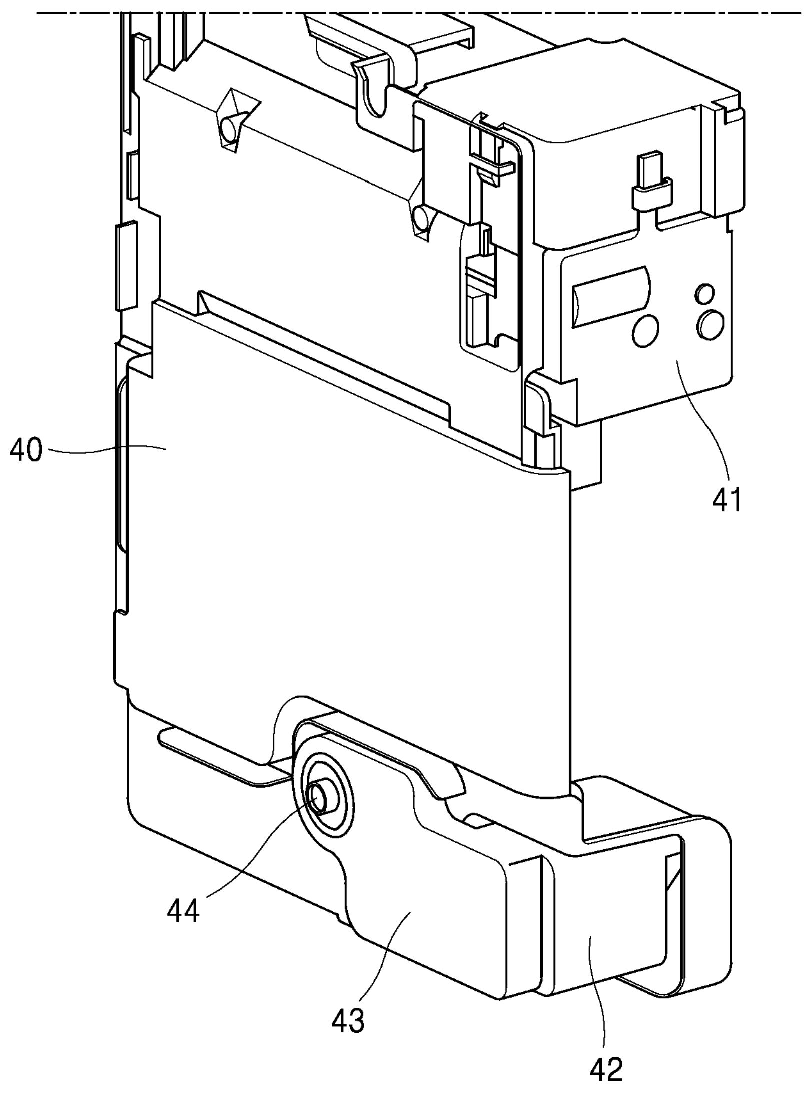

【Fig. 3】
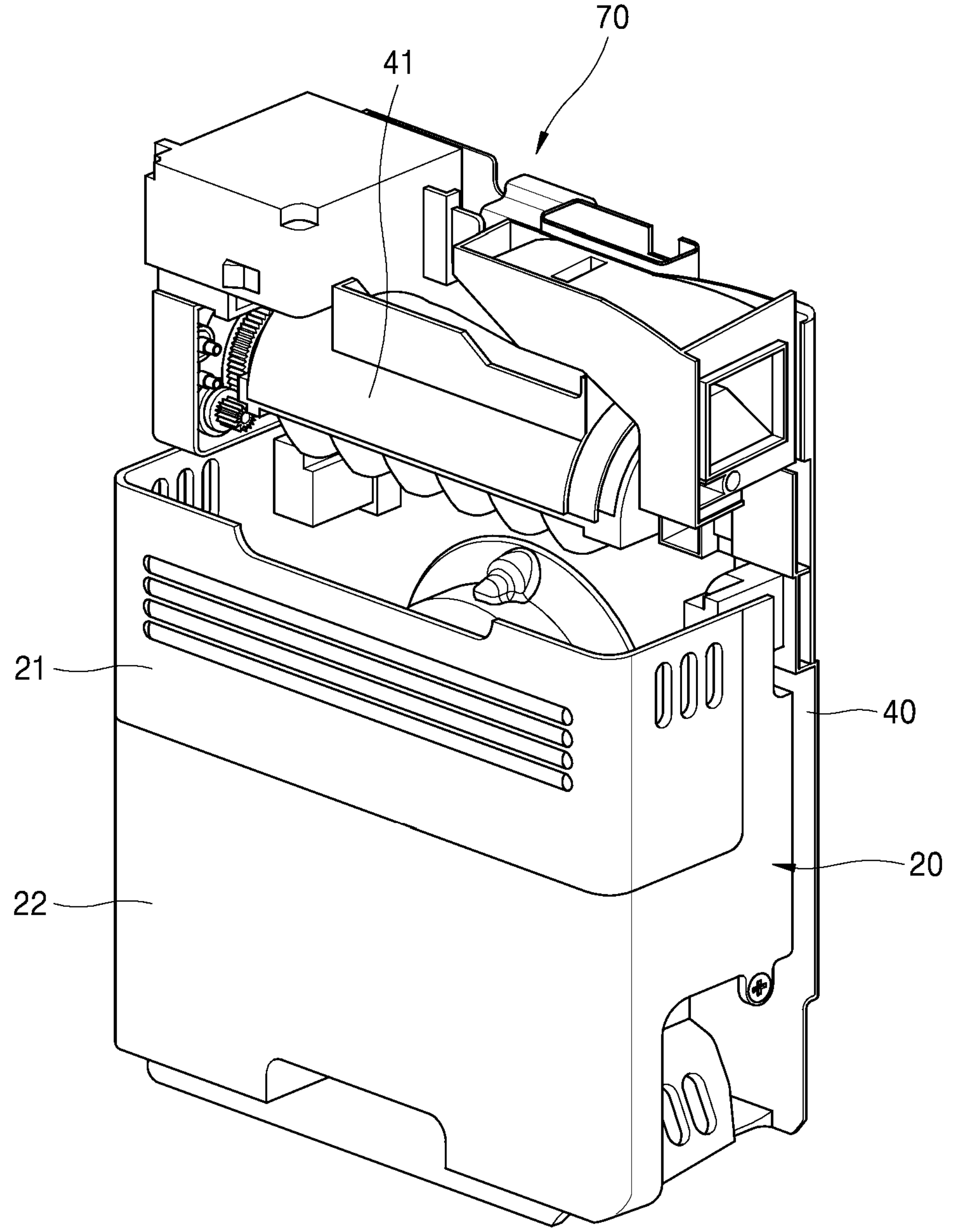

【Fig. 4】
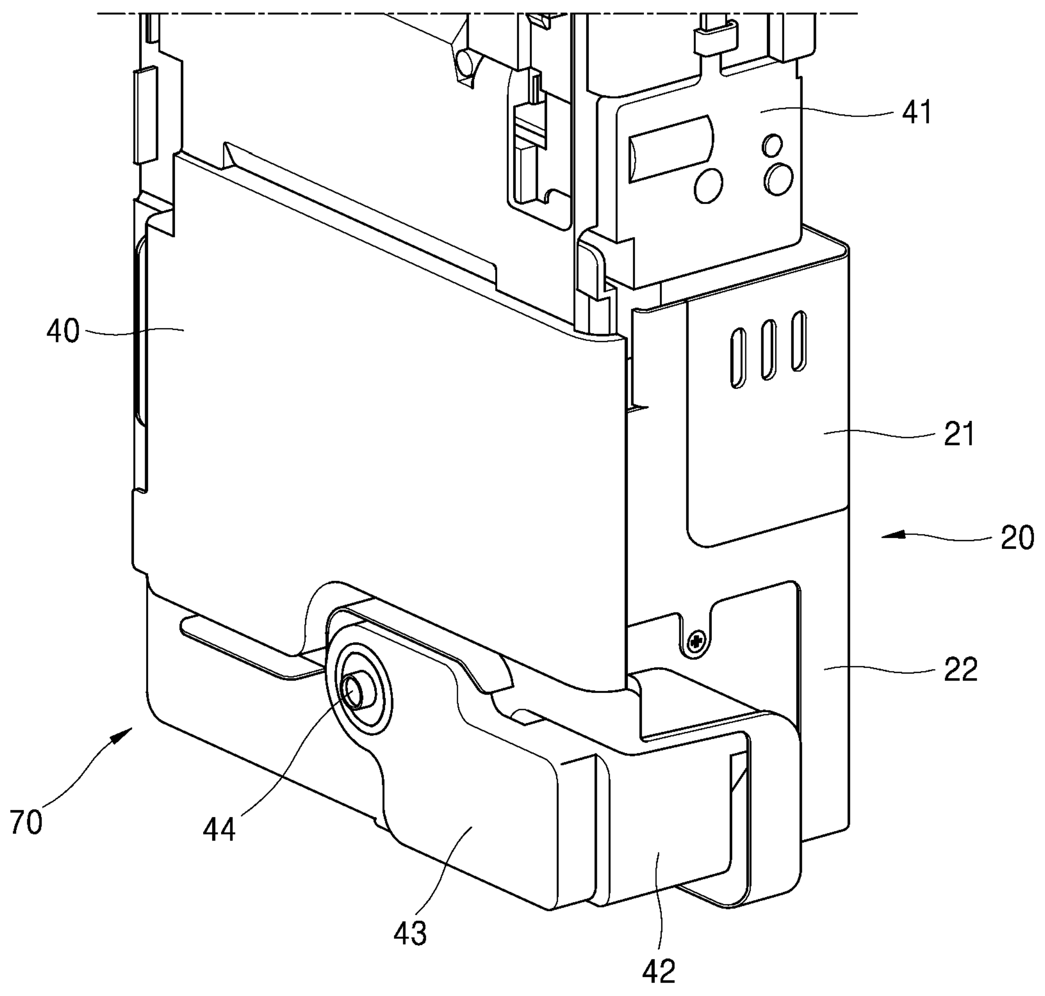

【Fig. 5】
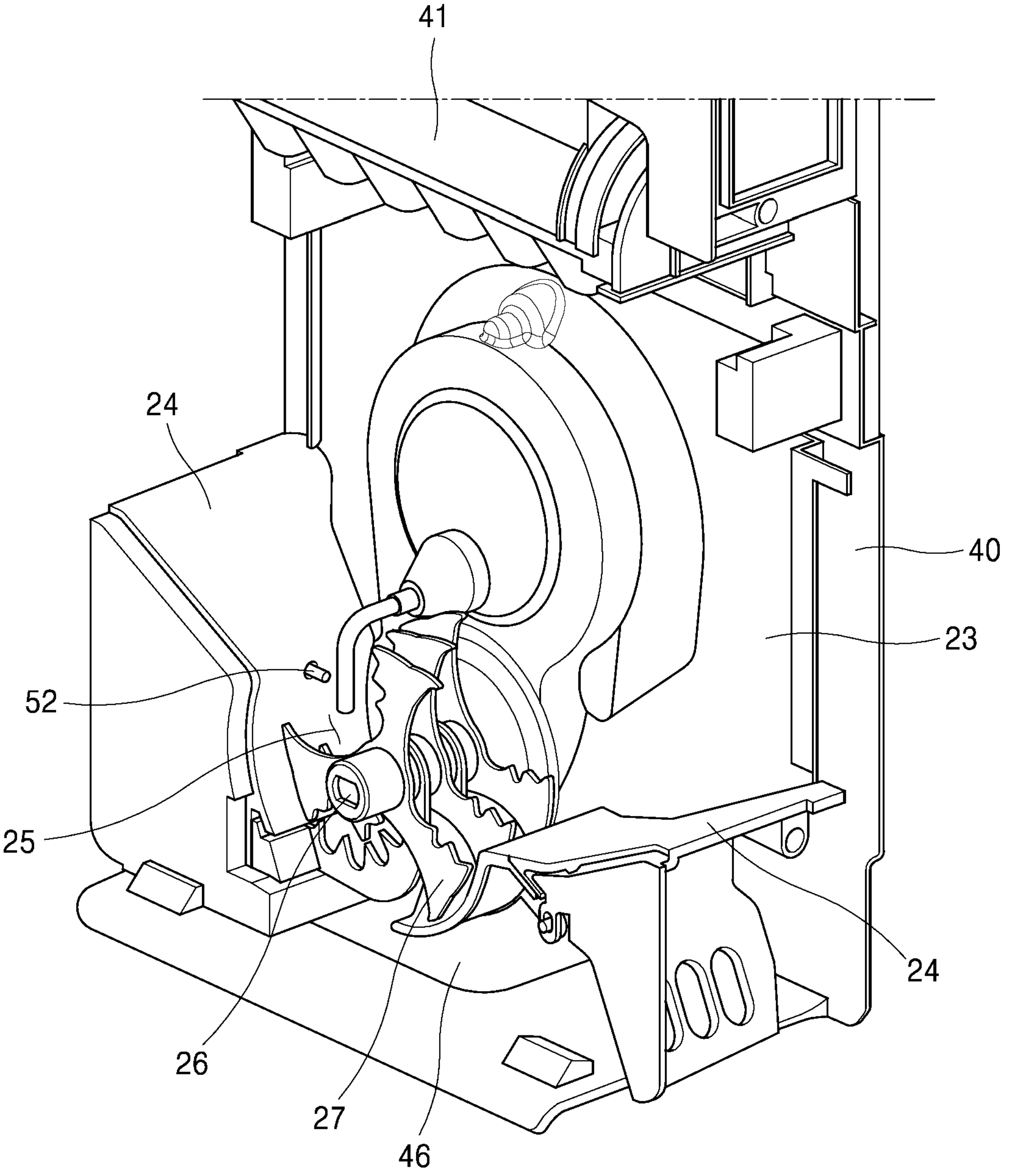

【Fig. 6】
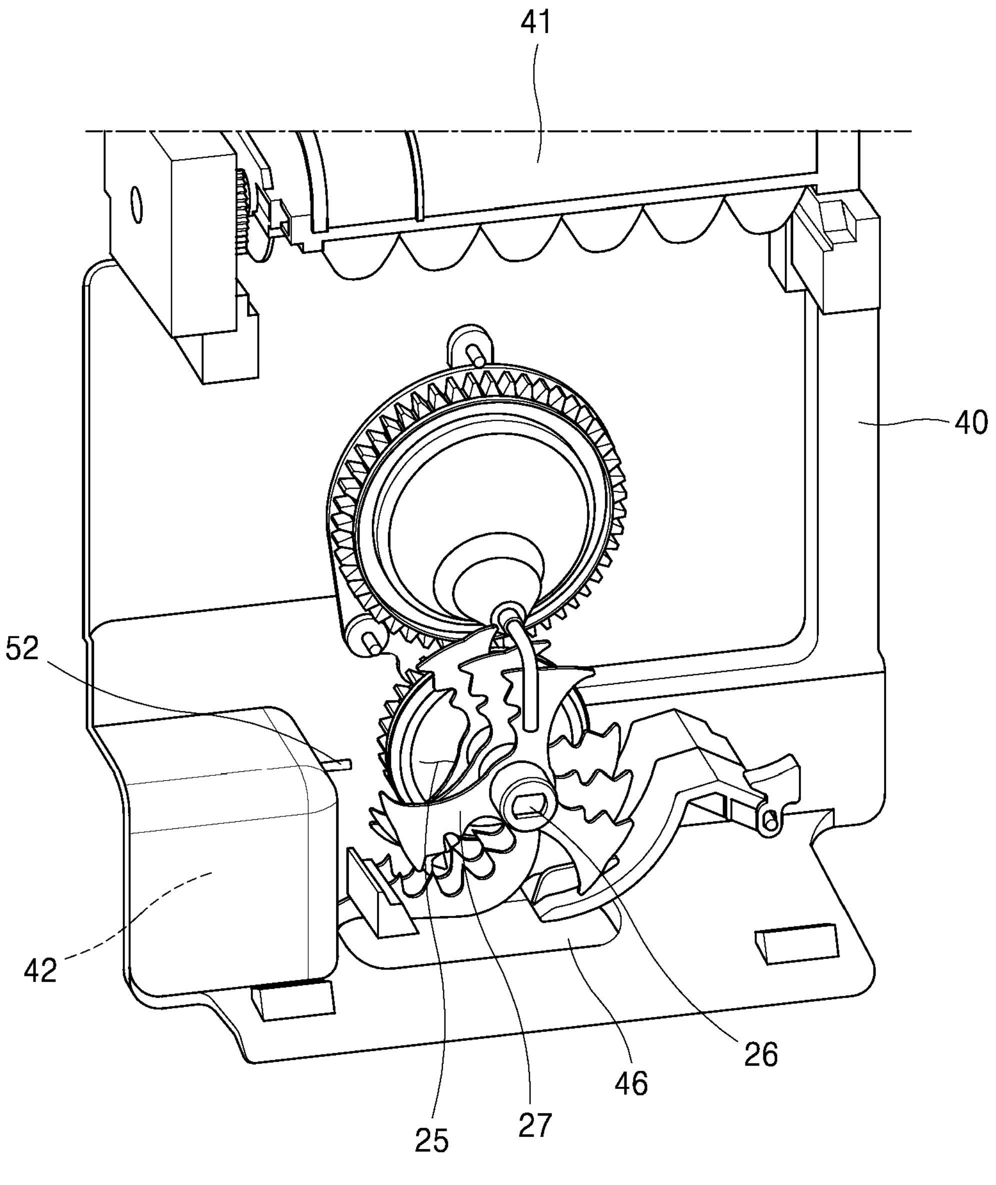

【Fig. 7】
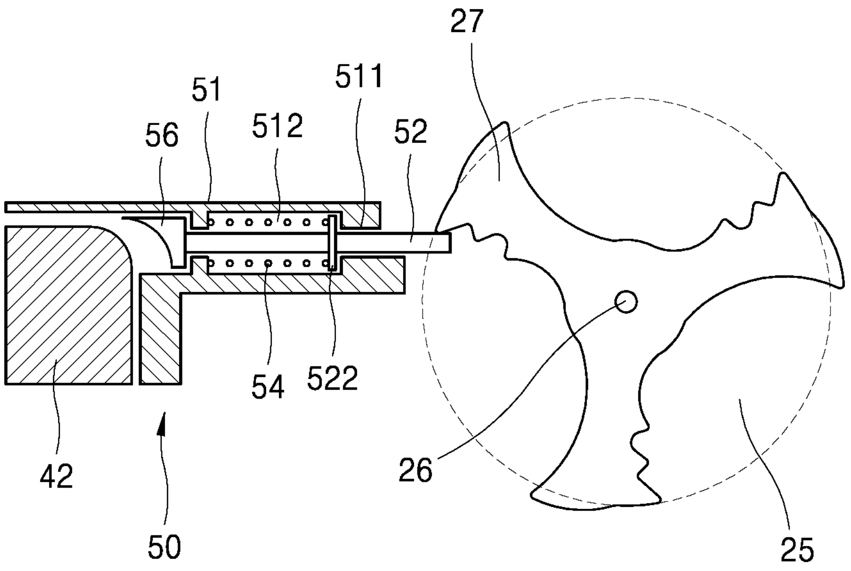
【Fig. 8】
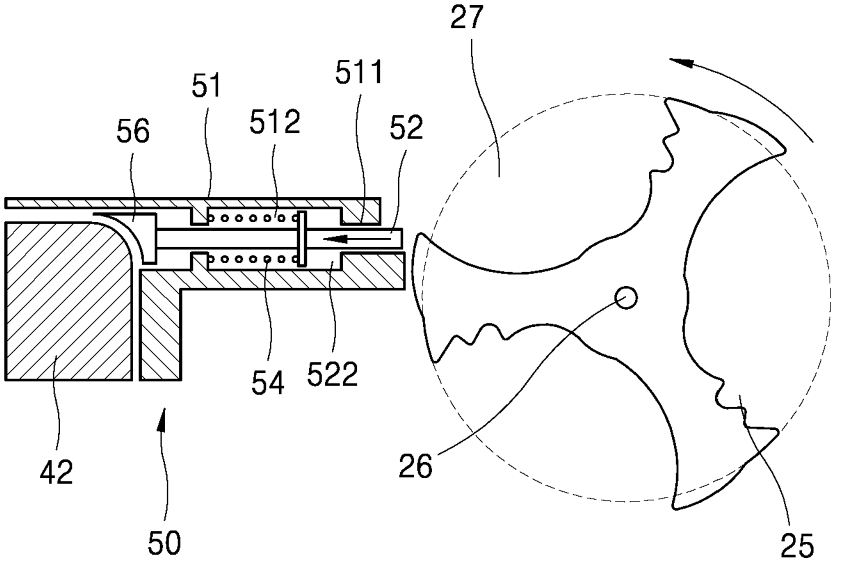

【Fig. 9】
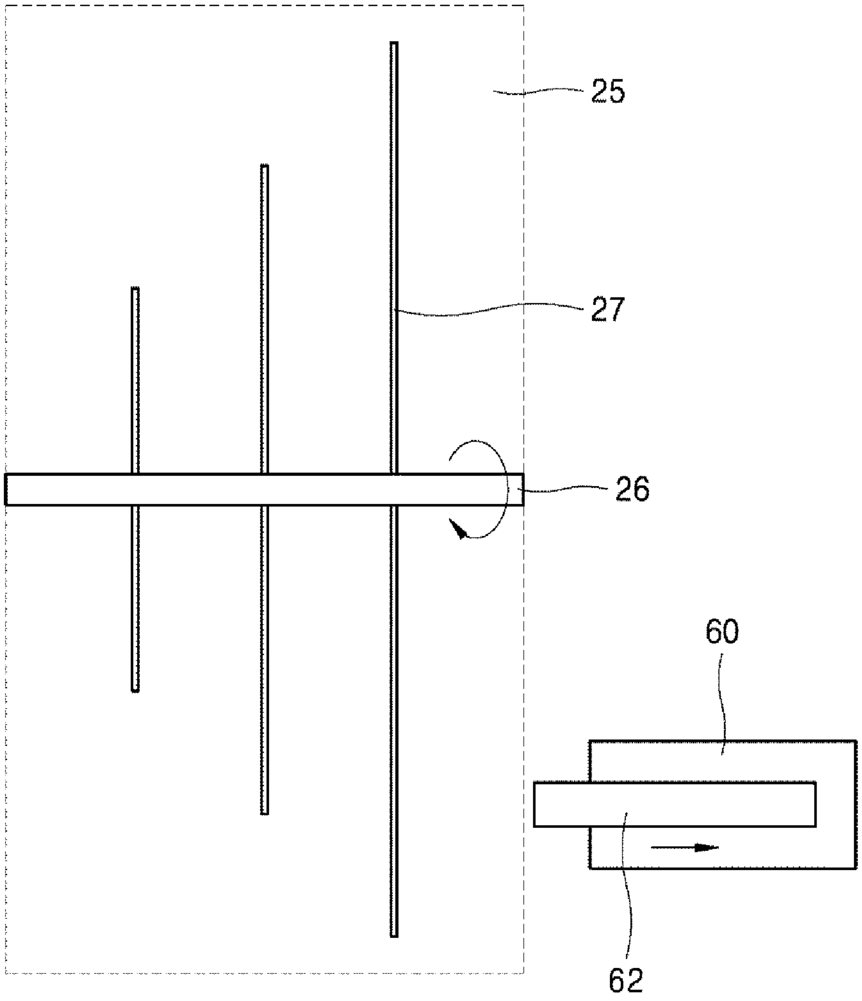

【Fig. 10】
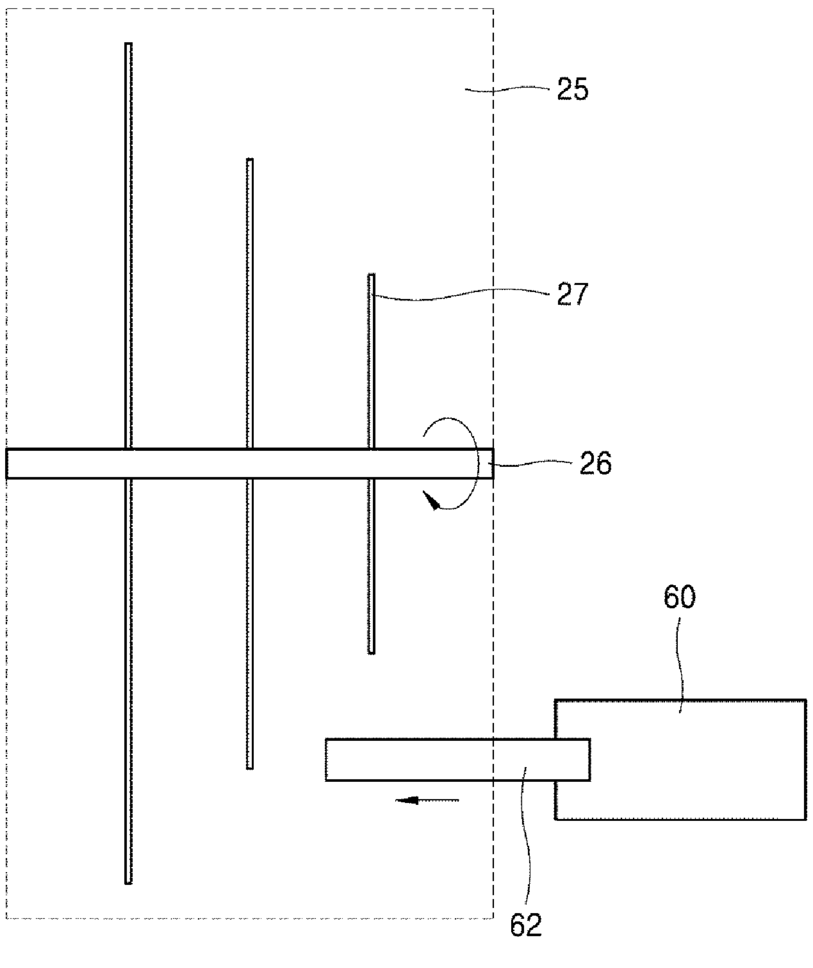

ICEMAKER ASSEMBLY HAVING A PLUNGER

CROSS-REFERENCE TO RELATED APPLICATION

This application claims priority from Korean Patent Application No. 10-2016-0053908, filed May 2, 2016, the subject matter of which is hereby incorporated by reference.

BACKGROUND

1. Field

The present disclosure relates to an icemaker assembly. More particularly, the present disclosure relates to a stopper of an ice bucket for promptly stopping withdrawal of ice when a command for withdrawal of ice from the ice bucket is stopped.

2. Background

A refrigerator may have an ice withdrawal function for easily withdrawing ice by a user. An ice outlet may be installed in a door and may be positioned over a shelf with a cup or a container to be placed thereon. When a user pushes a button, ice spills out through an ice outlet and may be contained in the cup or the container placed on the shelf.

The ice outlet is an end portion of a duct that is obliquely installed so that the ice can slidably exits. An internal space of the duct may be connected to an ice bucket that is a space for storing ice. Thus, a duct cap with a heat insulation function may be installed in the internal space of the duct so as to maintain the internal space of the duct in a freezing state.

A rotation member may be installed between the duct and the ice bucket so as to permit or intercept transfer of ice stored in the internal space of the ice bucket toward the duct. According to a principle of withdrawing ice, ice may be transferred to a space between portions of the rotation member only when the rotation member is rotated within a rotation chamber prepared by as much as a space corresponding to a trace of the rotation member. Thus, ice stored in the ice bucket may be withdrawn to the duct through the rotation chamber. That is, according to such a principle, ice may be withdrawn from the duct through the rotation chamber only when the rotation member is rotated, which may be understood via imagination of a revolving door of a doorway of a building.

The rotation member may receive power from a power generator, such as an electric motor, and the rotation member may be rotated. Accordingly, when a user pushes a withdrawal button in order to withdraw ice to supply power to the electric motor, the electric motor generates power to rotate the rotation member to withdraw ice. On the other hand, when the user releases the withdrawal button in order to stop the withdrawal of ice, power may be shut off to the electric motor and the rotation member may not be rotated any longer so as to stop an ice withdrawal operation.

However, an electric motor coupled to a rotation member and configured to generate and transmit power as well as the rotation member and all components included in a power transmitter have inertial and moment of inertia. Thus, even if a user releases a withdrawal button and shuts off power supply to the electric motor, the electric motor (that has been already rotated) and a power transmitter and a rotation member that are operatively associated with the electric motor may be redundantly rotated until the remaining kinetic energy is exhausted rather than being stopped immediately after power is shut off. Accordingly, after the user releases the withdrawal button, the rotation member may be redundantly rotated, and thus some ice may be further withdrawn.

An ice withdrawal button that is to be pushed by a user may be designed by being pushed, by the user, while pushing a container below an ice outlet. According to such a button method, the ice withdrawal button may be released simultaneously when the user pulls the container out from below the ice outlet. Accordingly, even if the user pulls the container out to release the ice withdrawal button, some ice may be further withdrawn. Such unpredicted ice may be dispensed and may fall on the floor after the container is removed. An inconvenience of falling ice may occur.

BRIEF DESCRIPTION OF THE DRAWINGS

Arrangements and embodiments may be described in detail with reference to the following drawings in which like reference numerals refer to like elements and wherein:

FIGS. 1 and 2 are perspective views of a main body housing of an ice withdrawal module;

FIGS. 3 and 4 are perspective views illustrating a state in which an ice bucket is installed in a main body housing;

FIG. 5 is a perspective view illustrating a state in which first and second lateral housings of an ice bucket are omitted from an ice withdrawal module;

FIG. 6 is a perspective view illustrating a state in which a third lateral housing and a chute housing are omitted in addition to the state shown in FIG. 5;

FIGS. 7 and 8 are schematic diagrams showing a blade of a rotation chamber and a stopper (or plunger module) for explanation of an operation of a plunger according to an embodiment; and FIGS. 9 and 10 are schematic diagrams showing a blade of a rotation chamber and a stopper (or plunger module) for explanation of an operation of a plunger according to an example embodiment.

DETAILED DESCRIPTION

The present disclosure may be described in detail by explaining exemplary embodiments with reference to the attached drawings.

The present disclosure may, however, be embodied in many different forms and should not be construed as being limited to the embodiments set forth herein. Rather, these embodiments may be provided so that this disclosure may be thorough and complete, and may fully convey the concept of the present disclosure to one of ordinary skill in the art.

Arrangements and embodiments may correspond to an icemaker assembly. In at least one embodiment, the icemaker assembly may have various components, such as an ice bucket, an ice outlet, a movement member (or blade), a stopper (having a plunger) and a power supply. In at least one embodiment, the icemaker assembly may include a plunger, a plunger housing, and an elastic body. In at least one embodiment, the icemaker assembly may include an ice withdrawal module.

Arrangements and embodiments may describe a plunger and a stopper. The stopper (or stopper device) may be an overall device that moves a plunger.

Embodiments may relate to an icemaker apparatus having a plunger to stop movement of a blade.

Structure of Ice Withdrawal Module

FIGS. 1 and 2 are perspective views of a main body housing of an ice withdrawal module. FIGS. 3 and 4 are perspective views illustrating a state in which an ice bucket is installed in a main body housing. FIG. 5 is a perspective view illustrating a state in which first and second lateral housings of an ice bucket are omitted from an ice withdrawal module. FIG. 6 is a perspective view illustrating a state in which a third lateral housing and a chute housing are omitted in addition to the state shown in FIG. 5. Each of FIGS. 1-6 may show portions of an icemaker assembly. Other arrangements and configurations may also be provided.

An ice withdrawal module 70 may include a main body housing 40 fixed to a refrigerator door and an ice bucket 20 detachably installed on the main body housing 40. An upside-down turn type icemaker 41 for making ice may be disposed on the main body housing 40. An ice outlet 46 of the ice withdrawal module 70 may be disposed below the main body housing 40. According to the present disclosure, the icemaker 41 is provided at the main body housing 40 installed in a door. However, the icemaker 41 may be installed at a cabinet as well as a door of a refrigerator.

An electric motor may be provided as a power supply for providing driving force for rotation of a blade of a rotation chamber included in an ice bucket. The electric motor may be installed at one side of a lower side of the main body housing 40. For example, the electric motor may be an alternating current (AC) induction electric motor including a rotor formed of a magnetic substance and a stator formed of an electromagnet. The AC induction electric motor may generate a magnetic field as the stator becomes an electromagnet while power is supplied to the stator. The magnetic field may be continuously maintained while power is supplied to the electric motor, and the magnetic field may disappear when power to the electric motor is shut off (or turned off).

A driving shaft of an electric motor 42 may be coupled to a gear box 43 so as to appropriately convert rotation speed and torque of the driving shaft of the electric motor and to be transmitted to a withdrawal rotation axis 26 as will be described below. A rotation axis 44 for output of the gear box 43 may extend forward from a center of a lower portion of the main body housing 40. A coupler 45 may be installed at a front end portion of the rotation axis 44, and the coupler 45 may be integrally rotated with the rotation axis 44.

As shown in FIG. 1, a plunger 52 may be provided (or installed) at one side of the lower portion of the main body housing 40. The plunger 52 may be installed in a perpendicular direction to an axial direction of the rotation axis 44 for transmitting rotation force toward the ice bucket 20 through the coupler 45. That is, a longitudinal direction of the plunger 52 may be perpendicular to a longitudinal direction of the rotation axis 44. The plunger 52 provided at the main body housing 40 may extend and protrude to a rotation chamber 25 through a chute housing 24 of the ice bucket 20 while the ice bucket 20 is provided at the main body housing. However, an installation position of the plunger 52 is not limited to the main boy housing. Alternatively, the plunger 52 may be provided at the ice bucket 20, may be integrally provided (or installed) with the main body housing or the ice bucket, and/or may be detachably provided at the main body housing or the ice bucket.

The ice bucket 20 may be detachably installed to a space provided below the icemaker 41 (of the main body housing 40). The ice bucket 20 may provide a space for storing ice that is made in an icemaker. The ice bucket 20 may include a movement member 27 for transmitting ice stored in the space toward the ice outlet 46 of the main body housing 40.

A third lateral housing 23 may be disposed behind the ice bucket 20, a second lateral housing 22 may be disposed in front of the ice bucket 20 with a predetermined interval from the third lateral housing 23, and the chute housing 24 may be installed at a lower portion between the second and third lateral housings 22 and 23. That is, the second lateral housing 22 may be fixed to a front surface of the chute housing 24 and the third lateral housing 23 may be fixed to a rear surface of the chute housing 24. A first lateral housing 21 that contacts the second housing 22 may be installed above a second housing 22. The first lateral housing 21 may be installed to be open or detached with respect to the second lateral housing 22. A space defined by the lateral housings 21, 22, and 23 and the chute housing 24 may be coupled to a lower portion of the icemaker 41, and may be a space for storing ice.

The chute housing 24 may define a bottom of the ice storage space and may be inclined in a downward direction inward from the outside. The guide housing thus may guide stored ice to be collected to a central portion of the ice storage space according to gravity. The rotation chamber 25 for connecting the ice storage space and the ice outlet 46 may be provided between two portions of the chute housing 24 (or at a central portion of the chute housing 24). The rotation chamber 25 may be shaped as if a half formed by cutting an imaginary cylinder in a diameter direction is provided with a curved surface facing downward.

The withdrawal rotation axis 26 may be rotatably provided (or installed) at a center of the curved surface of the rotation chamber 25, and the withdrawal rotation axis 26 may receive rotation force from a rear end portion through the coupler 45 of the rotation axis 44. The rotation axis 44 may be installed so as to integrally rotate a plurality of blades 27 or helixes with the rotation axis 44. The blades 27 may be respectively fixed to a plurality of portions (three portions in the example embodiment) spaced apart with a predetermined interval in a longitudinal direction of the rotation axis 44. The plurality of blades 27 may also be referred to as a movement member. With regard to the blades fixed to the respective portions, three blades may extend in a radial direction with an interval of 120 degrees and an angle of a position at which a blade extends with respect to the rotation axis may be gradually changed for each of the three portions provided in a longitudinal direction of the rotation axis. An uneven portion may be provided at an end portion of one side of a blade so as to grasp ice and to break ice as necessary.

The plunger 52 may protrude to an internal space of the rotation chamber 25. The blades 27 may define a rotation trajectory and a movement trajectory formed as the blades 27 are rotated around the withdrawal rotation axis 26. As such, when the plunger 52 protrudes into the rotation chamber 25 (or enters the rotation chamber), the blade 27 and the plunger 52 interfere with each other, restricting rotation of the blade 27.

As described above, a component for power transmission in the gear box 43 connected to a rotor of the electric motor 42 may act as a power supply and may be configured to transmit power. The rotor and the blade 27 may have a significant quantity of movement according to moment of inertia during rotation around each rotation axis. Accordingly, even if power supply to the electric motor is shut off (or turned off), the components may be rotated until the aforementioned movement quantity is exhausted. Thus, the blades 27 may be redundantly rotated rather than being promptly stopped.

The plunger 52 may be capable of reciprocating between a position on a rotation trajectory of the blades 27 provided in the rotation chamber 25, into which the plunger 52 protrudes, and a position from which the plunger 52 is pulled out of the rotation chamber 25 and is deviated from the rotation trajectory. Accordingly, when the plunger 52 enters the rotation chamber 25, rotation of the blade 27 may be prevented and when the plunger 52 is pulled out of the rotation chamber, rotation of the blade 27 may be permitted.

First Embodiment of Method of Controlling Operation of Plunger and Operating Principle of Plunger As a method of controlling the plunger 52 according to an example embodiment, when a user operates an ice withdrawal button to rotate a blade and to move ice of an ice storage space to an ice outlet, a plunger may be pulled out (or exited out of) of the rotation chamber 25 (or out of the rotation trajectory) and the blade may be permitted to rotate. When the ice withdrawal button is not pushed to stop the blade, that is, in an ordinary state or when a pushing operation of the ice withdrawal button is released and thus the blade is not inevitably rotated any longer, the plunger may protrude and enter the rotation chamber 25, and rotation of the blade may be prevented.

FIGS. 7 and 8 are schematic diagrams showing a blade of a rotation chamber and a stopper (or plunger module) for explanation of an operation of a plunger according to an example embodiment. Other embodiments and configurations may also be provided.

FIG. 7 shows a stopper 50 (or plunger module). FIG. 7 also show that the plunger 52 that protrudes toward the rotation chamber or exits the rotation chamber may be provided at one side of the rotation chamber 25. The plunger 52 may be provided in a plunger housing 51. The plunger housing 51 may include a through hole 511 that is formed in a direction in which the plunger enters or exits the rotation chamber. The plunger 52 may be installed to enter or exit the rotation chamber by being inserted into the through hole 511 and be guided in a longitudinal direction of the through hole.

A plunger chamber 512 for accommodation of a plunger may be provided in the plunger housing 51. A portion of the plunger may be inserted into the plunger chamber 512. A flange 522 that extends in a radial direction of the plunger may be provided in the portion of the plunger, inserted into the plunger chamber 512, and may also be provided in the plunger chamber 512. The flange 522 may be manufactured with a size such that the flange 522 is accommodated in the plunger chamber 512 and such that the flange is larger than the through hole 511 so as not to be pulled out of the plunger chamber 512. The flange 522 may be fixed so as to restrict movement at least in a longitudinal direction with respect to the plunger 52. Accordingly, a range of movement of the flange 522 in an entrance or exit direction of the plunger in the plunger chamber 512 may correspond to a range of movement of the plunger 52 both forward and backward.

A coil spring 54 may be installed around the plunger. The coil spring 54 may be an elastic body. The elastic body may also be accommodated in the plunger chamber 512. The coil spring 54 may be a compression coil spring, for example. A first lateral end portion of the coil spring 54 may be supported by an internal wall of the plunger chamber 512, which is farther from the rotation chamber among internal walls of the plunger chamber, and a second lateral end portion of the coil spring 54 may be supported by the flange 522. Accordingly, the coil spring 54 may elastically pressurize the flange 522 toward the rotation chamber 25, and accordingly, the plunger 52 may also be elastically pressurized toward the rotation chamber 25.

When an operation for withdrawal is not performed, the plunger 52 may enter the rotation chamber 25 according to elasticity of the elastic body (of the coil spring 54) and may be positioned on a movement trajectory of the blade 27, as shown in FIG. 7. Accordingly, in this example, rotation of the blade 27 may be limited and ice may not be withdrawn through the rotation chamber 25.

The electric motor 42 may be installed at the other side of the plunger. For example, FIG. 7 shows a magnetic substance 56 provided at the other end portion of the plunger 52. When power is not supplied to the electric motor 42 (i.e., when the ice withdrawal button is not pushed), a magnetic field is not generated by the electric motor. Accordingly, external force may not be applied to the magnetic substance 56. That is, in an ordinary state, power is not supplied to the electric motor and external force is not applied to the plunger. Thus, a state in which the plunger enters the rotation chamber 25 may be maintained by a spring, and a slight gap (or small gap) may be present between the magnetic substance 56 and the electric motor 42, as shown in FIG. 7.

When a user operates an ice withdrawal module in order to withdraw ice, a magnetic field may be generated by the electric motor based on power supplied to the electric motor 42, and the magnetic substance 56 (or driven portion) affected by the magnetic field may be moved toward the electric motor 42, as shown in FIG. 8. The elasticity of the spring may be lower than external force applied to the aforementioned driven portion (i.e., the magnetic substance 56 according to the magnetic field provided by the electric motor 42), and the magnetic substance 56 may be moved toward the electric motor 42 by overcoming the elasticity of the spring, and thus the plunger 52 may exit the rotation chamber 25.

The blades 27 may receive driving force of the electric motor 42 through power transmitters, and as described above the plunger 52 may already exit the rotation chamber 25, and thus the blades 27 may rotate without interference of the plunger. A magnetic field that supplies power to the electric motor may be rapidly formed, whereas the blades 27 may not be promptly rotated according to moment of inertia of a rotor portion of a motor, a power transmission system, and a blade. Accordingly, since the driven portion is moved according to the magnetic field, the plunger 52 may rapidly exit from the rotation chamber 25 and then the blades may begin to rotate. The plunger 52 that is not pulled out (or exited) may be stuck to the blade, thereby preventing the blade from rotating.

When a user releases the pushed operation button to shut off power supplied to the electric motor 42, intensity of the magnetic field may be rapidly weakened. Additionally, even if the magnetic field does not completely disappear, the plunger 52 may protrude into the rotation chamber 25 based on elasticity of the spring immediately after force for pulling the magnetic substance 56 according to the magnetic field is weaker than elasticity of the spring. On the other hand, as described above, the blade may redundantly rotate according to moment of inertia and power supplied to the electric motor is shut off. Then, the blade may immediately interfere with the plunger protruding into the rotation chamber and the blade may stop being rotated.

Even if the plunger 52 and an outermost end portion of the blade collides with each other at a moment when the plunger enters the rotation chamber, the plunger may be elastically supported by the spring so as to have a margin for withdrawal. Thus, impact may not be applied to the plunger and the plunger housing 51 supported thereby. Additionally, when the blade is further rotated and is removed in front of the plunger 52, the plunger may immediately re-protrude due to the spring.

According to such a structure of a stopper (or plunger module) 50, since the electric motor that is already installed in order to drive the blade without a separate plunger driver is used as a power source of the plunger, it may not be necessary to change a structure of an existing power supply or a power transmitter, and since the structure is simple and the magnetic field that is immediately embodied compared with moment of inertia is used, a prompt stop operation may be easily embodied. Additionally, since a buffer range is present between the plunger and the plunger housing while an operation of pushing the plunger forward by the spring is embodied, even if the blade and the plunger collide with each other, the impact may be alleviated by the spring.

Although a magnetic substance may be integrally installed with a rear end of the plunger according to an example embodiment, the present disclosure is not limited thereto, and even if a direction in which a magnetic substance is moved according to a magnetic field generated by an electric motor does not correspond to a direction in which a plunger is moved, another structure or component may be used as long as the magnetic substance and the plunger are connected using a different method such as a link and the plunger exits the rotation chamber in association with movement of the magnetic substance based on the magnetic field.

Although an example has been described in which a magnetic field generated during supply of power to the electric motor and external force is applied to the plunger by a magnetic substance (driven portion) pulled by the magnetic field is applied to the plunger (stopper) in order to provide power to the blade (movement member), various types of plunger drivers may be applied for providing external force with higher responsibility than moment of inertia of a system for driving the blade.

For example, even if a solenoid (or other similar devices), which operate according to an electromagnetic field, are used, the same effect may also be achieved via associated control of simultaneously supplying power to the solenoid when power is supplied to an electric motor for supplying driving force for rotation of the blade. Additionally, a similar effect may be achieved by driving the plunger when some driving force of a power transmitter system is used and moving speed or rotation speed is converted such that the plunger is more rapidly moved than an operation of the blade actively using a gear ratio and etc.

Second Embodiment of Method of Controlling Operation of Plunger and Operating Principle of Plunger As a method of controlling the plunger according to another example embodiment, when the ice withdrawal button is not pushed to stop the blade, that is, in an ordinary state or when a user operates an ice withdrawal button to rotate a blade and to move ice of an ice storage space to an ice outlet, a plunger is pulled out of the rotation chamber 25, and the blade may be permitted to be rotated. When a pushing operation of the ice withdrawal button is released and thus the blade is not rotated any longer, the plunger 52 may briefly protrude into and enter the rotation chamber 25, thereby preventing rotation of the blade. This method may be more advantageous in that an ice withdrawal operation is not affected even if a malfunction or error occurs in a structure related to driving of a plunger since a state in which a plunger exits a rotation chamber is a basic position.

A time period during which the plunger protrudes and enters the rotation chamber may be determined as a predetermined time (e.g. several seconds to several tens of seconds). As a different method, the plunger may protrude and enter a rotation chamber, a rotation state of the blade may be detected and checked to determine that the blade stops, and then the plunger may be re-pulled out of the rotation chamber.

FIGS. 9 and 10 are schematic diagrams showing a blade of a rotation chamber and a stopper for explanation of an operation of a plunger according to an example embodiment. Other embodiments and configurations may also be provided.

Unlike in the direction of the plunger described with reference to the aforementioned drawings, a direction in which a plunger 62 shown in FIGS. 9 and 10 enters and exits may correspond to a longitudinal direction of a withdrawal rotation axis 26. That is, when any direction to move the plunger 62 to enter or exit the rotation chamber 25 is used, a prompt stop effect may be achieved, and such a direction in which the plunger enters and exits may be determined according to an internal structure, a space margin, and so on of the ice withdrawal module 70. For example, in the above structure of the ice withdrawal module of FIGS. 1 to 6, a plunger is provided between the rotation chamber 25 and the electric motor 42. The plunger is installed to enter and exit in a parallel direction to a direction in which the rotation chamber 25 and the electric motor 42 are arranged. This is because a space margin is present adjacent to a position in which the electric motor 42 is installed, external force applied to the plunger is applied in a direction toward the electric motor, and the plunger needs to be arranged in a direction in which the plunger protrudes toward the rotation chamber or is pulled out of the rotation chamber.

As shown in FIG. 9, according to another example embodiment, external force for driving the plunger 62 is provided by a separate driver instead of a power supply or a power transmitter system for supplying power to the blade 27, and an example of the separate driver may be a solenoid 60.

When power is supplied to the solenoid 60 exemplified according to the present disclosure, a magnetic field may be generated to move the plunger in the solenoid 60 in one direction, and when power is supplied to the solenoid 60 in a different direction or through a different terminal, an opposite magnetic field may be generated to move the move the plunger in the solenoid 60 to another direction. A magnet in the solenoid 60 may be provided at a rear end portion (i.e., a farther portion from the rotation chamber) of the solenoid 60 so as to pull the plunger in a direction in which the plunger is pulled out of the rotation chamber 25. That is, in an ordinary state, the plunger 62 of the solenoid 60 may be pulled out (or exited) toward a rear end portion of the solenoid 60 and may be temporally fixed by the magnet.

In order to withdraw ice, when power is supplied to the electric motor during rotation of the blade 27, power may also be supplied to the solenoid 60 at the same time in a direction in which the plunger is pulled out to re-generate magnetic force so as to completely pull out the stopper.

Accordingly, when the user manipulates a button and so on in order to stop ice withdrawal, power supplied to the electric motor may be shut off (or turned off). At this moment, power is supplied to the solenoid 60 using another method and a magnetic field is generated in a direction in which the plunger 62 is moved toward the rotation chamber 25 to immediately move the plunger forward, as shown in FIG. 10. In this case, the generated magnetic field is stronger than a magnetic field generated by a magnet at a rear end portion of a solenoid.

As such, when power is supplied in a direction in which the plunger is moved forward, and then the blade is stopped by the plunger, stoppage of the blade may be detected, and in this case power may be re-supplied to a solenoid so as to generate a magnetic field in a direction in which the plunger may be pulled out. Accordingly, the plunger may be pulled out (or exited) to maintain the state of FIG. 9 in which the plunger contacts the magnet at the rear end portion of the solenoid.

According to the present disclosure, a solenoid may be configured such that a magnet is installed at a rear end portion of the solenoid using a state in which a plunger is pulled out as a basic position and that a direction in which an electromagnetic field is generated is changed according to a difference in a direction in which power is supplied to the solenoid or a difference of terminals for supplying power. However, in an ordinary state, a driving structure using various methods may be applied by applying force in a direction in which a plunger is pulled out by an elastic substance, a magnet, and/or the like, and applying force in a direction in which a plunger protrudes forward in association with manipulation for stopping ice withdrawal.

An ice withdrawal operation may be promptly and definitely stopped despite inertia of components used to withdraw ice at a time when the ice withdrawal operation needs to be stopped.

The aforementioned prompt stop operation may be embodied without adding a separate driver.

The prompt stop operation may be embodied without change in an existing ice withdrawal structure or while minimizing such change.

A prompt stopper may be simply configured as a module and may be commonly applied to various ice withdrawal structures.

Ice withdrawal may be securely prevented while the ice withdrawal operation is not performed.

Although a malfunction occurs in a prompt stopper, an ice withdrawal operation may not be affected, thereby minimizing user inconvenience.

It is an object to provide a prompt stopper of an ice bucket for promptly stopping an ice withdrawal operation at a time when the ice withdrawal operation needs to be stopped.

It is an object to provide a prompt stopper of an ice bucket for promptly stopping an ice withdrawal operation without a separate driver.

It is an object to provide a prompt stopper of an ice bucket for promptly stopping an ice withdrawal operation by adding a structure without a change in an existing ice withdrawal driving structure.

It is an object to provide a prompt stopper of an ice bucket that does not affect an ice withdrawal operation even if a malfunction occurs.

The present disclosure may provide a device configured in such a way that a stopper or a plunger may enter a rotation trajectory of a movement member, disposed between an ice storage space and an ice outlet of an ice bucket and configured to move ice during movement, at a time when the movement member may need to be stopped so as to promptly stop the movement member by the stopper (plunger), an ice withdrawal module including the device, and a refrigerator including the ice withdrawal module.

In accordance with one aspect of the present disclosure, a prompt stopper of an ice bucket may include an ice bucket including an ice storage space, an ice outlet configured to be connected to the ice storage space of the ice bucket, a movement member disposed between the ice storage space and the ice outlet and configured to be moved in a space between the ice storage space and the ice outlet to move ice stored in the ice storage space toward the ice outlet, and a stopper configured to enter a rotation trajectory of the movement member to stop movement of the movement member and to be pulled out from the rotation trajectory of the movement member to permit movement of the movement member. Thus, the stopper may interfere with the movement member on a rotation trajectory of the movement member to promptly stop the movement member at a desired time.

The stopper may be pulled out from the rotation trajectory while power is supplied to the movement member and may enter the rotation trajectory when power is not supplied to the movement member. According to this structure, the stopper may be easily designed to operate in association with power provided to the movement member.

Elastic force may be applied to the stopper in a direction in which the stopper enters the rotation trajectory of the movement member. That is, when there is no external force exceeding the elastic force, the stopper is always positioned at a position for stopping movement of the movement member and, thus, the stopper may promptly return to the rotation trajectory when external force pulling out the stopper from the rotation trajectory disappears so as to stop movement of the movement member.

The stopper may be pulled out from the rotation trajectory by external force when power is supplied to the movement member. When the external force is provided by a power supply for generating power provided to the movement member, power supply and power supply stoppage of the power supply may be synchronized with an operation of the stopper so as to very accurately perform the operation of the stopper.

The power supply may include a structure that generates a magnetic field when power is supplied and that does not generate a magnetic field when power is not supplied. The stopper may be affected by the magnetic field and pulled out from the rotation trajectory when the magnetic field is generated by the power supply. In this case, it may not be necessary to install a separate power source for operating the stopper and the stopper may be operated without changing a structure of a power transmitter for transmitting power generated by the power supply to the movement member (for example, a gearbox). Additionally, generation and removal of the magnetic field may have higher responsibility than movement according to moment of inertia.

The external force may be provided to the stopper in association with a control signal for providing power to the movement member. For example, when the aforementioned stopper is operated by a solenoid, power may also be supplied to the solenoid during power supply in order to supply power to the movement member so as to pull out the stopper from the rotation trajectory of the movement member and power to the solenoid may be shut off when power is shut off in order to shut off power to the movement member so as to allow the stopper to enter the rotation trajectory of the movement member.

The stopper may be pulled out from the rotation trajectory in an ordinary state and promptly enter the rotation trajectory after power supplied to the movement member is shut off. The stopper may be pulled out from the rotation trajectory after the movement member has stopped by the stopper. According to this structure, even if the stopper malfunctions and is stopped, movement of the movement member may not be affected. Thus, operations of components for ice withdrawal may not be affected by malfunction of the stopper.

Force may be applied to the stopper in a direction in which the stopper is pulled out from the rotation trajectory of the movement member. That is, even if the prompt stopper of an ice bucket malfunctions and external force supplied to the stopper is not present at a desired time, the stopper may always be pulled out from the rotation trajectory according to elastic force of a spring.

In a device that complies with this operating principle, the stopper may receive external force to enter the rotation trajectory in association with control for shutting off power supplied to the movement member. Thus, the movement member may be promptly stopped so as not to withdraw the remaining ice.

In accordance with one aspect of the present disclosure, a prompt stopper of an ice bucket may include a plunger configured to enter a rotation trajectory and to be pulled out from the rotation trajectory of a movement member that moves ice of the ice bucket toward an ice outlet, a plunger housing including a through hole with the plunger inserted thereto and configured to guide entrance and exit of the plunger and a plunger chamber with the plunger inserted thereto and configured to restrict a distance of entrance and exit of the plunger, and an elastic body installed in the plunger housing and configured to pressurize the plunger in an entrance direction. The plunger may include a driven portion configured to receive external force generated while power is supplied to a movement member by a power supply for providing power for moving the movement member and configured to move the plunger in a direction for pulling out the plunger from the rotation trajectory.

The prompt stopper of an ice bucket may be configured as a module. Thus, an installation direction or position of the prompt stopper may be applied according to configurations of peripheral components, and the prompt stopper may be applied to an ice bucket with different ice withdrawal structures.

In particular, the external force may be a magnetic field generated during supply of power to the power supply, and the driven portion may be a magnetic substance pulled according to the magnetic field. In this case, the prompt stopper of an ice bucket may be embodied simply by installing the plunger housing around the power supply without a separately added component.

The plunger may include a flange protruding in a direction that crosses a direction of entrance and exit of the plunger. The flange may be accommodated in the plunger chamber and moved to correspond to a longitudinal direction of the plunger chamber to restrict distance of entrance and exit of the plunger, thereby easily configuring the plunger housing as a module.

When the elastic body is a coil spring installed around the plunger and inserted into the plunger chamber, and a first side end portion of the coil spring is supported by an internal wall of the plunger chamber and a second side end portion is supported by the flange, a plunger housing may be designed as a very compact and simple structure.

In accordance with one aspect of the present disclosure, an ice withdrawal module for a refrigerator is provided that includes said prompt stopper, an ice bucket with a space for accommodating ice therein, an ice outlet from which ice accommodated in the ice bucket is withdrawn, a movement member disposed between the ice bucket and the ice outlet and configured to move ice of the ice bucket toward the ice outlet, a power supply configured to move power to move the movement member. The prompt stopper of an ice bucket is provided around the movement member. A refrigerator including the ice withdrawal module may be provided so as to provide convenience of assembly during production, to provide use convenience of a refrigerator user, and to provide convenience of maintenance.

A more detailed effect according to the present disclosure has been described thus far.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An icemaker assembly, comprising:

an ice bucket including an ice storage space;

an ice outlet to couple to the ice storage space of the ice bucket;

a blade disposed between the ice storage space and the ice outlet, the blade configured to move in a rotational trajectory in a space between the ice storage space and the ice outlet, and the blade to move ice stored in the ice storage space toward the ice outlet; and a plunger configured to enter a rotation trajectory of the blade to stop movement of the blade, and the plunger configured to exit out from the rotation trajectory of the blade to permit movement of the blade.

2. The icemaker assembly according to claim 1, wherein the plunger is to exit out from the rotation trajectory while power is supplied to move the blade, and the plunger is to enter the rotation trajectory when power is not supplied to move the blade.

3. The icemaker assembly according to claim 2, wherein the plunger is to enter to the rotation trajectory when power is not supplied to move the blade, based on an elastic force applied to the plunger in a direction in which the plunger enters the rotation trajectory of the blade.

4. The icemaker assembly according to claim 2, wherein the plunger is to exit out from the rotation trajectory based on external force when power is supplied to move the blade.

5. The icemaker assembly according to claim 4, comprising a power supply to provide the external force and to provide power to move the blade.

6. The icemaker assembly according to claim 5, wherein:

the power supply provides a magnetic field when power is supplied, and does not provide a magnetic field when power is not supplied; and the plunger is affected by the magnetic field and exits out from the rotation trajectory when the magnetic field is provided by the power supply.

7. The icemaker assembly according to claim 4, wherein the external force is provided to move the plunger while power is supplied to move the blade.

8. The icemaker assembly according to claim 1, wherein the plunger is to exit out from the rotation trajectory in an ordinary state, and the plunger to promptly enter the rotation trajectory after power supplied to move the blade is shut off, and then the plunger is to exit out from the rotation trajectory after the blade is stopped.

9. The icemaker assembly according to claim 8, wherein force is applied to the plunger in a direction in which the plunger is to exit out from the rotation trajectory of the blade.

10. The icemaker assembly according to claim 9, wherein the plunger is to enter the rotation trajectory by external force in association with a control operation for shutting off power provided to move the blade.

11. A stopper of an icemaker assembly comprising:

a plunger configured to enter a rotation trajectory of a blade for moving ice of an ice bucket toward an ice outlet, and the plunger to exit out from the rotation trajectory;

a plunger housing including a through hole and a plunger chamber, wherein the plunger to be inserted into the plunger chamber and into the through hole, and the plunger housing is configured to guide entrance and exit of the plunger with respect to the rotation trajectory, and the plunger housing is configured to restrict a distance of entrance and exit of the plunger with respect to the rotation trajectory; and an elastic body at the plunger housing, and the elastic body configured to move the plunger in a direction toward the rotation trajectory, wherein the plunger includes a driven portion configured to receive external force provided while power is supplied to move the blade by a power supply for providing power for moving the blade, and the driven portion is to move the plunger in a direction for exiting the plunger out from the rotation trajectory.

12. The icemaker assembly according to claim 11, wherein:

the external force is a magnetic field generated during supply of power to the power supply; and the driven portion is a magnetic substance to move in the direction for exiting the plunger based on the magnetic field.

13. The icemaker assembly according to claim 11, wherein:

the plunger includes a flange, wherein the flange is provided in the plunger chamber and is moved to correspond to a longitudinal direction of the plunger chamber, and the flange is to restrict a distance of entrance and exit of the plunger.

14. The icemaker assembly according to claim 13, wherein:

the elastic body is a coil spring provided at the plunger, and the coil spring is provided in the plunger chamber; and a first side end portion of the coil spring is supported by an internal wall of the plunger chamber and a second side end portion is supported by the flange.

15. An icemaker assembly for a refrigerator, comprising:

an ice bucket having a space for accommodating ice therein;

an ice outlet to allow ice accommodated in the ice bucket to be withdrawn;

a blade disposed between the ice bucket and the ice outlet, and the blade is configured to move ice from the ice bucket toward the ice outlet;

a power supply configured to provide power to move the blade; and a plunger disposed at the blade, the plunger configured to enter a rotation trajectory of the blade to stop movement of the blade, and the plunger is configured to exit out from the rotation trajectory of the blade to allow movement of the blade.

16. The icemaker assembly according to claim 15, wherein the plunger is to exit out from the rotation trajectory while power is supplied to move the blade, and the plunger to enter the rotation trajectory when power is not supplied to move the blade.

17. The icemaker assembly according to claim 16, wherein elastic force is applied to the plunger to move the plunger and to enter the rotation trajectory of the blade; and the plunger is to exit out from the rotation trajectory by external force provided by the power supply when power is provided to move the blade.

18. The icemaker assembly according to claim 16, wherein:

a solenoid is used to move the plunger; and power is supplied to the solenoid while power is supplied to move the blade.

19. The icemaker assembly according to claim 15, wherein the power supply to provide an external force to move the plunger and to provide power to move the blade.

20. The icemaker assembly according to claim 19, wherein:

the power supply provides a magnetic field when power is supplied, and does not provide a magnetic field when power is not supplied; and the plunger is affected by the magnetic field and exits out from the rotation trajectory when the magnetic field is provided by the power supply.

* * * * *